US011330124B2

(12) United States Patent
Urita

(10) Patent No.: US 11,330,124 B2
(45) Date of Patent: May 10, 2022

(54) IMAGE READING APPARATUS

(71) Applicant: CANON KABUSHIKI KAISHA, Tokyo (JP)

(72) Inventor: Akira Urita, Ibaraki (JP)

(73) Assignee: Canon Kabushiki Kaisha, Tokyo (JP)

(\*) Notice: Subject to any disclaimer, the term of this patent is extended or adjusted under 35 U.S.C. 154(b) by 0 days.

(21) Appl. No.: 16/950,222

(22) Filed: Nov. 17, 2020

(65) Prior Publication Data

US 2021/0168251 A1 Jun. 3, 2021

(30) Foreign Application Priority Data

Nov. 29, 2019 (JP) .............................. JP2019-216152

(51) Int. Cl.
*H04N 1/04* (2006.01)
*H04N 1/00* (2006.01)

(52) U.S. Cl.
CPC . *H04N 1/00559* (2013.01); *H04N 2201/0446* (2013.01)

(58) Field of Classification Search
CPC ........... H04N 1/00442; H04N 1/00559; H04N 2201/0446
USPC ........ 358/497, 474, 496, 400, 401; 399/211, 399/212
See application file for complete search history.

(56) References Cited

U.S. PATENT DOCUMENTS

| 2005/0190413 A1* | 9/2005 | Khovaylo | H04N 1/1017 358/474 |
| 2015/0181071 A1* | 6/2015 | Katayama | H04N 1/1043 358/497 |

FOREIGN PATENT DOCUMENTS

JP 2015-119421 6/2015

\* cited by examiner

*Primary Examiner* — Cheukfan Lee
(74) *Attorney, Agent, or Firm* — Venable LLP

(57) ABSTRACT

An image reading apparatus incudes a guiding shaft extending in an axial direction; a reading portion supported by the shaft so as to be movable in the axial direction; a casing accommodating the reading portion, the casing including a first supporting portion supporting an end portion of the shaft and a second supporting portion supporting the other end portion of the shaft; and an elastically deformable bonding portion bonding the casing and the shaft with each other, the bonding portion being provided between the first supporting portion and the second supporting portion in the axial direction and between the casing and the shaft in a diametrical direction perpendicular to the axial direction. The shaft is supported by the first supporting portion, the second supporting portion and the bonding portion, without contact to the casing except for the first supporting portion and the second supporting portion.

7 Claims, 5 Drawing Sheets

IMAGE READING APPARATUS

FIELD OF THE INVENTION AND RELATED ART

The present invention relates to an image reading apparatus which reads an image on a sheet of recording medium.

There has been proposed an image reading apparatus having: a casing; a guide rail supported by the casing; and an image reading unit which moves in the secondary scan direction while being guided by the guide rail (Japanese Laid-open Patent Application No. 2015-119421). The casing is provided with a pair of positioning ribs, and ribs for adhesive. The guide rail is supported by the pair of positioning ribs from their underside. Further, the ribs for adhesive are positioned between the pair of positioning ribs, and the top surface of each rib for adhesive is coated with adhesive, with which the guide rails are adhered.

The casing and pair of positioning ribs disclosed in Japanese Laid-open Patent Application No. 2015-119421 are parts of a monolithic component. Therefore, it sometimes occurs that as the casing deforms, the pair of positioning ribs displaces toward the guide rail.

The guide rail is directly in contact with the pair of positioning ribs. Therefore, it is possible that the displacement of the pair of positioning ribs will be transmitted to the guide rail, and cause the guide rail to deform. If the guide rail deforms, it becomes impossible for the image reading unit, which is guided by the guide rail, to accurately read the image on a sheet of recording medium.

SUMMARY OF THE INVENTION

An object of the present invention is to provide an image reading apparatus which can more accurately read an image on a sheet of recording medium than any conventional image reading apparatus.

According to an aspect of the present invention, there is provided an image reading apparatus comprising: a guiding shaft extending in an axial direction; a reading portion supported by said guiding shaft so as to be movable in the axial direction; a casing accommodating said reading portion, said casing including a first supporting portion supporting an end portion of said guiding shaft and a second supporting portion supporting the other end portion of said guiding shaft; and an elastically deformable bonding portion bonding said casing and said guiding shaft with each other, the bonding portion being provided between said first supporting portion and said second supporting portion in the axial direction and between said casing and said guiding shaft in a diametrical direction perpendicular to the axial direction, wherein said guiding shaft is supported by said first supporting portion, said second supporting portion and said bonding portion, without contact to said casing except for said first supporting portion and said second supporting portion.

Further features of the present invention will become apparent from the following description of exemplary embodiments with reference to the attached drawings.

DESCRIPTION OF THE EMBODIMENTS

The present invention is described, with reference to the image forming apparatus A in one of the preferred embodiments of the present invention, and appended drawings. By the way, the image reading apparatus in this embodiment is described as a stand-alone image reading apparatus. However, not only is the present invention applicable to a stand-alone image reading apparatus as an image scanner, but also, an image reading apparatus which is an integral part of such an image forming apparatus as a copying machine, a printing machine, a facsimileing machine, or a multifunction machine capable of functioning as one or more of the preceding machines.

Further, in this embodiment, an "original" includes not only an image formed on a sheet of ordinary paper, but also, an image formed on a special paper such as a coated paper, an image formed on recording media such as an envelop and a sheet of index paper, which are specific in shape, an image formed on a sheet of plastic for an overhead projector, and an image formed on fabric. In addition, an original includes a sheet of white paper, a sheet of recording medium having an image on one of its two surfaces, a sheet of recording medium having an image on both of its surfaces.

[Overall Structure]

Figure 1:
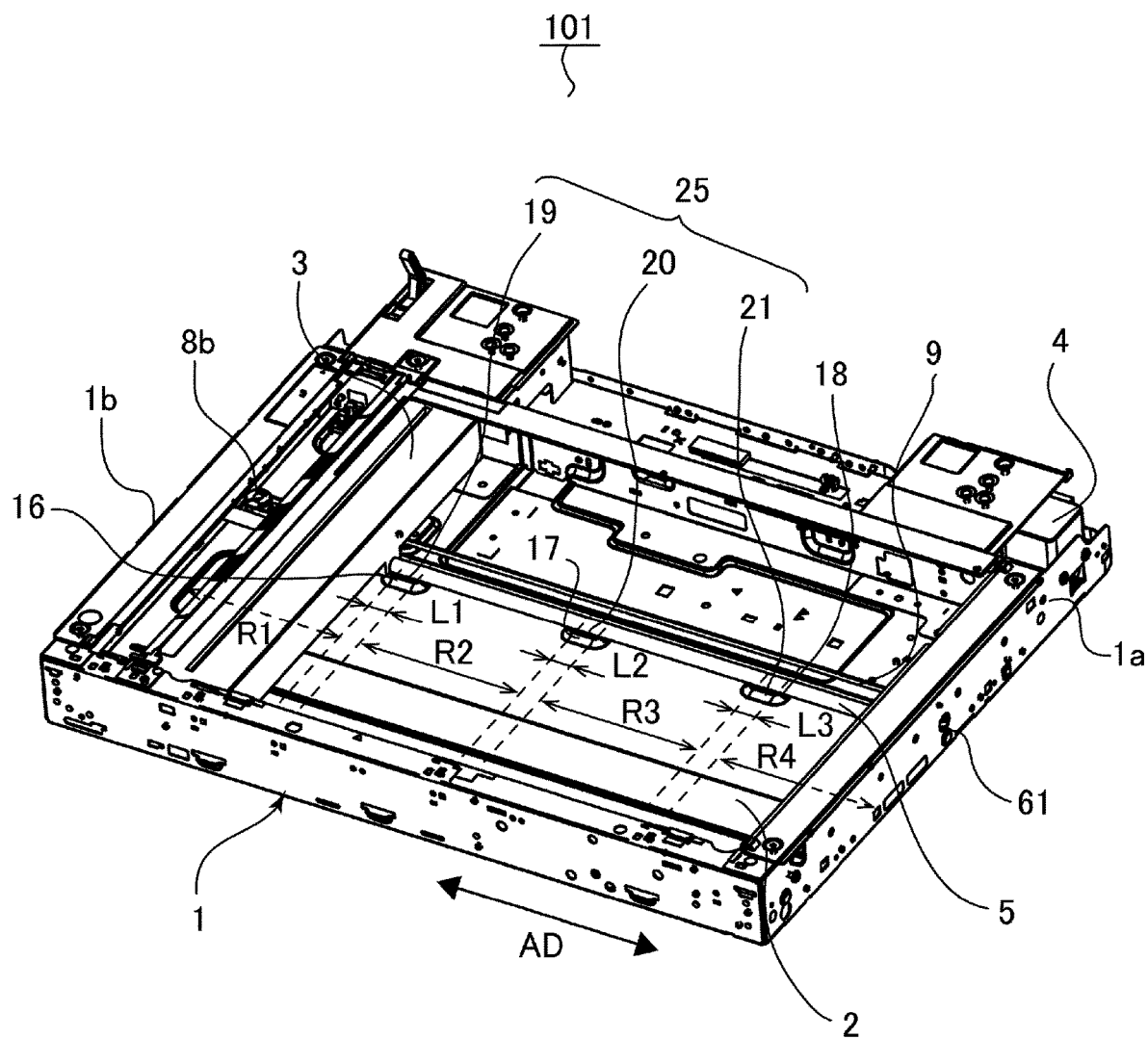
FIG. 1 is a perspective view of the image reading apparatus in one of the preferred embodiments of the present invention.
Figure 2:
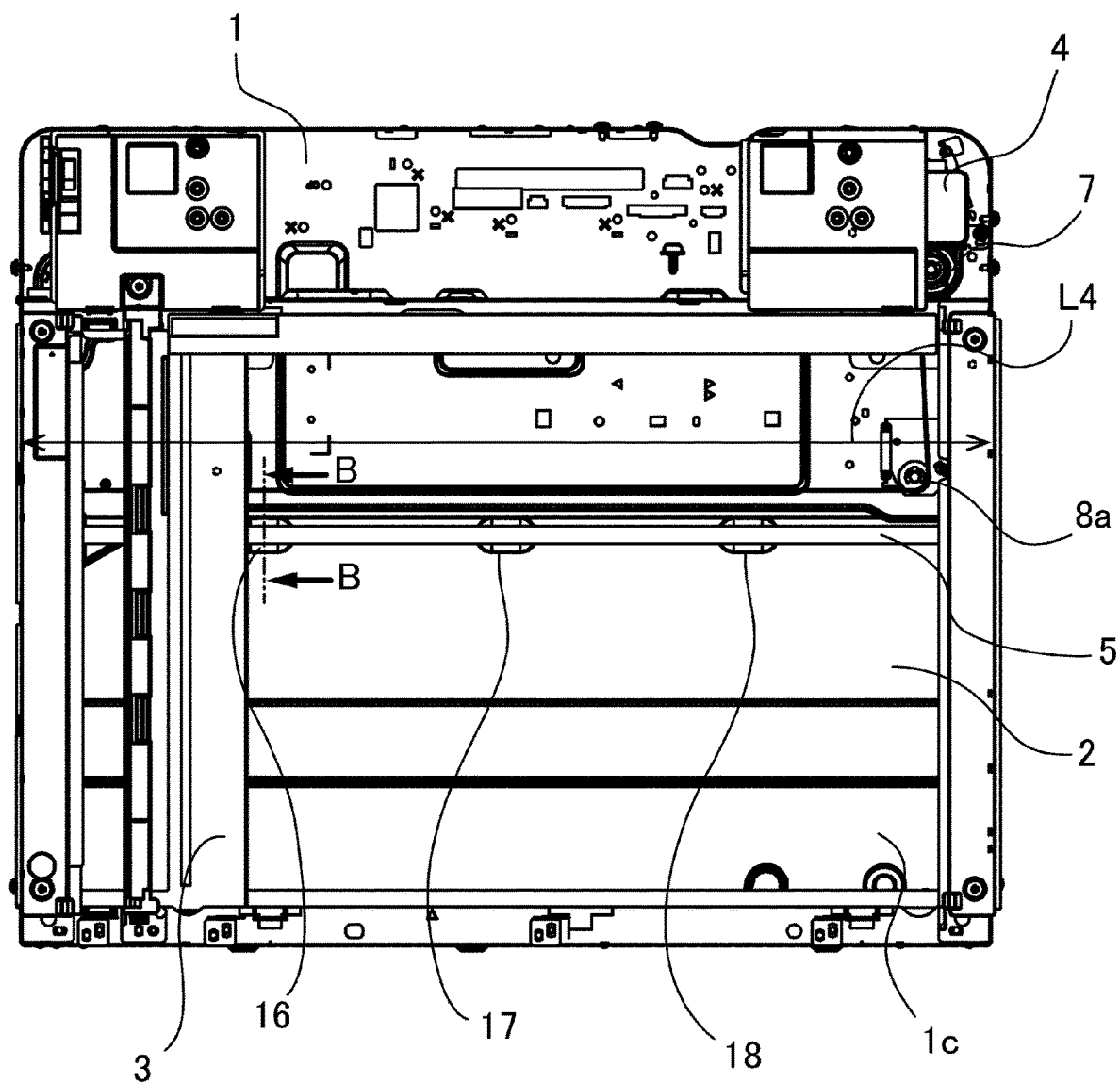
FIG. 2 is a top view of the image reading apparatus shown in FIG. 1.

Referring to FIGS. 1 and 2, the image reading apparatus 101 has: a casing 1; and a glass platen 2 for an original, which is in the top portion of the casing 1. The casing 1 is in the form of a box having an internal space. It is formed of a metallic material such as a sheet of metallic plate. It functions as the frame of the image reading apparatus 101.

Disposed in the internal space of the casing 1 are: a guide shaft 5, which extends in the shaft direction AD, which is parallel to the secondary scan direction; a gear pulley 7; a pair of pulleys 8a and 8b; a drive belt 9 which is wrapped around the combination of the gear pulley 7 and pulleys 8a and 8b; and a reading portion 3. The gear pulley 7 is driven by a motor 4 supported by the casing 1. As the gear pulley 7 is driven by the motor 4, the drive belt 9 rotationally moves.

Not only is the reading portion 3 supported by the drive belt 9 and guide shaft 5, but also, guided by the guide shaft 5 in the shaft direction AD. Further, also disposed in the internal space of the casing 1 is an unshown detecting portion which detects whether or not the reading portion 3 is in its standby position in which it is to be when it is not reading an image.

In this embodiment, the standby position of the reading portion 3 coincides with the left end of the internal space of the casing 1 in FIGS. 1 and 2. When the reading portion 3 is in its standby position, it reads (detects) the edge of the original on the glass platen 2 for an original. When the reading portion 3 is on standby before a job for reading the image of an original is inputted, it remains on standby in its standby position.

The reading portion 3 has: an unshown carriage which holds an image sensor and other internal components; an unshown light source for casting light on an original. The image sensor has electrical connection to an unshown control portion through an unshown FFC (flexible flat cable) which is in the form of a belt. The information obtained by the reading of an original by the image sensor is transmitted to the control portion.

As an original is set on the glass platen 2, and a scan job is started, the drive belt 9 is driven by the motor 4. As the drive belt 9 is driven, the reading portion 3 which is supported by the drive belt 9, is moved from its standby position in the shaft direction AD along the guide shaft 5. During this movement of the reading portion 3, the original on the glass platen 2 is scanned (original is read) by the reading portion 3.

As the reading portion 3 moves to a preset position which corresponds to the size of the original, the motor 4 begins to be driven in reverse. As a result, the drive belt 9 begins to rotate in reverse. Thus, the reading portion 3 returns to its standby position, ending the reading operation.

[Structure for Supporting Guide Shaft]

Figure 3:
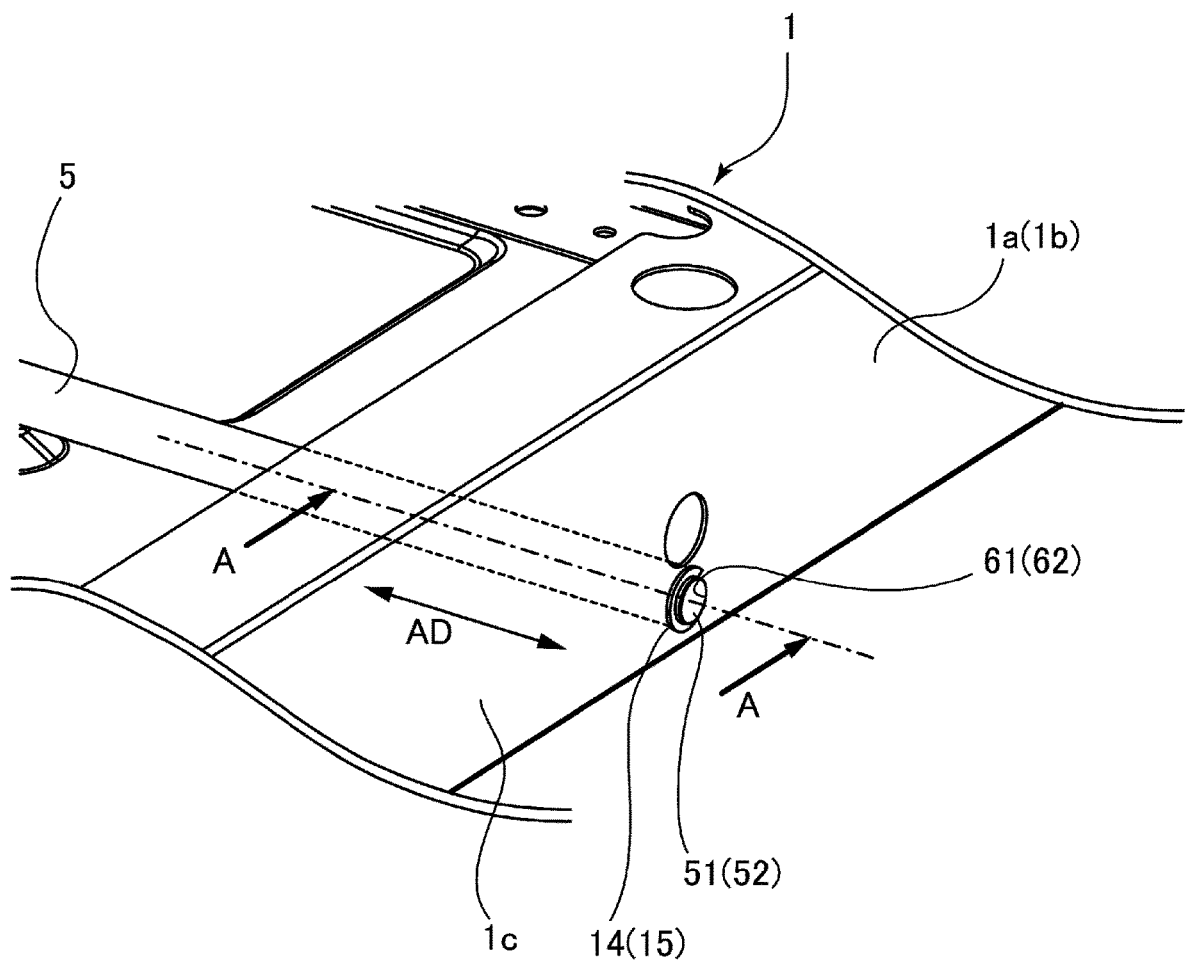
FIG. 3 is a perspective view of one of the end portions of the guide shaft, and its adjacencies.

Next, the structural arrangement for supporting the guide shaft 5 is described in detail. FIG. 3 is a perspective view of one 51 (or other 52) of the lengthwise end portions of the guide shaft 5, and its adjacencies, in terms of the shaft direction AD. The lengthwise end portions 51 and 52 are similar in the structural arrangement by which they are supported.

Figure 4:
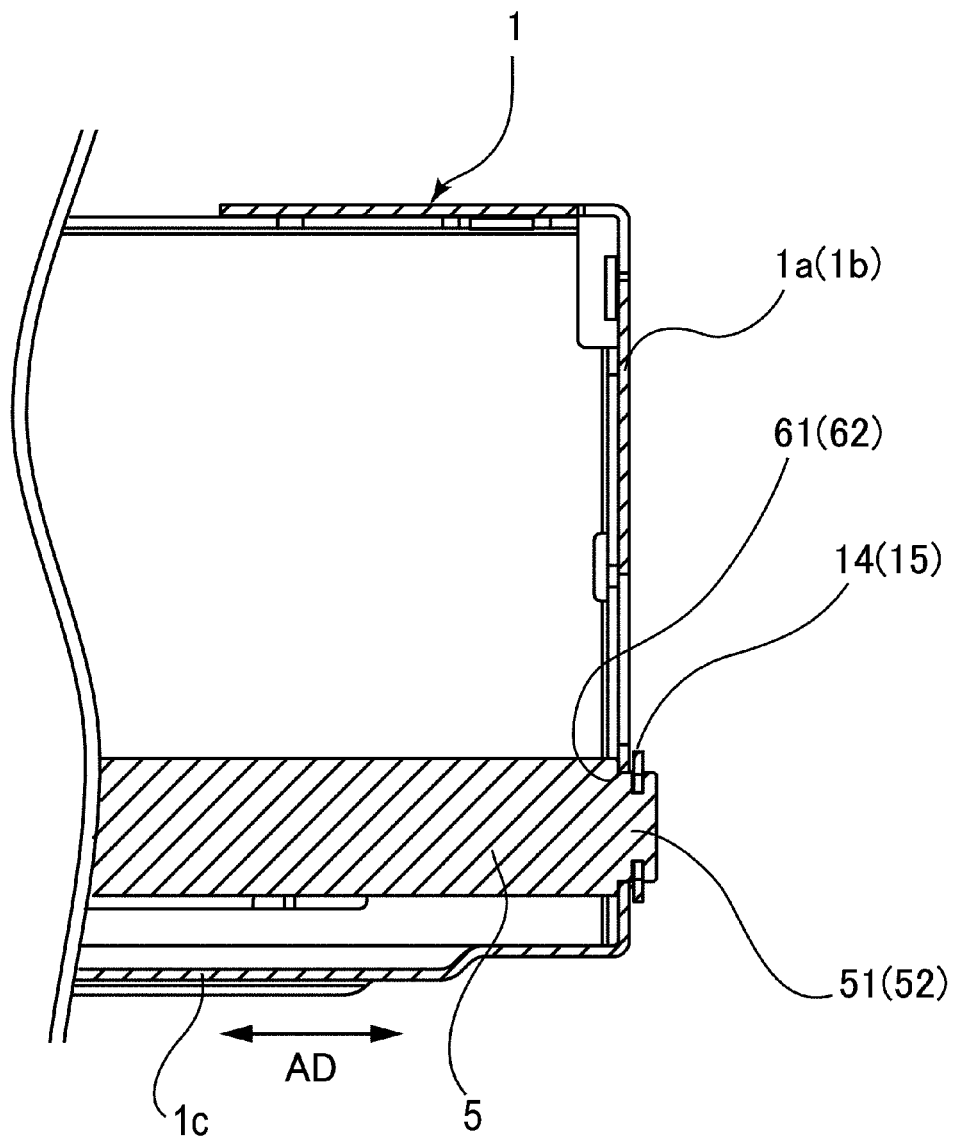
FIG. 4 is a sectional view of the end portion of the guide shaft, and its adjacencies, shown in FIG. 3, at a plane A-A in FIG. 3.
Figure 5:
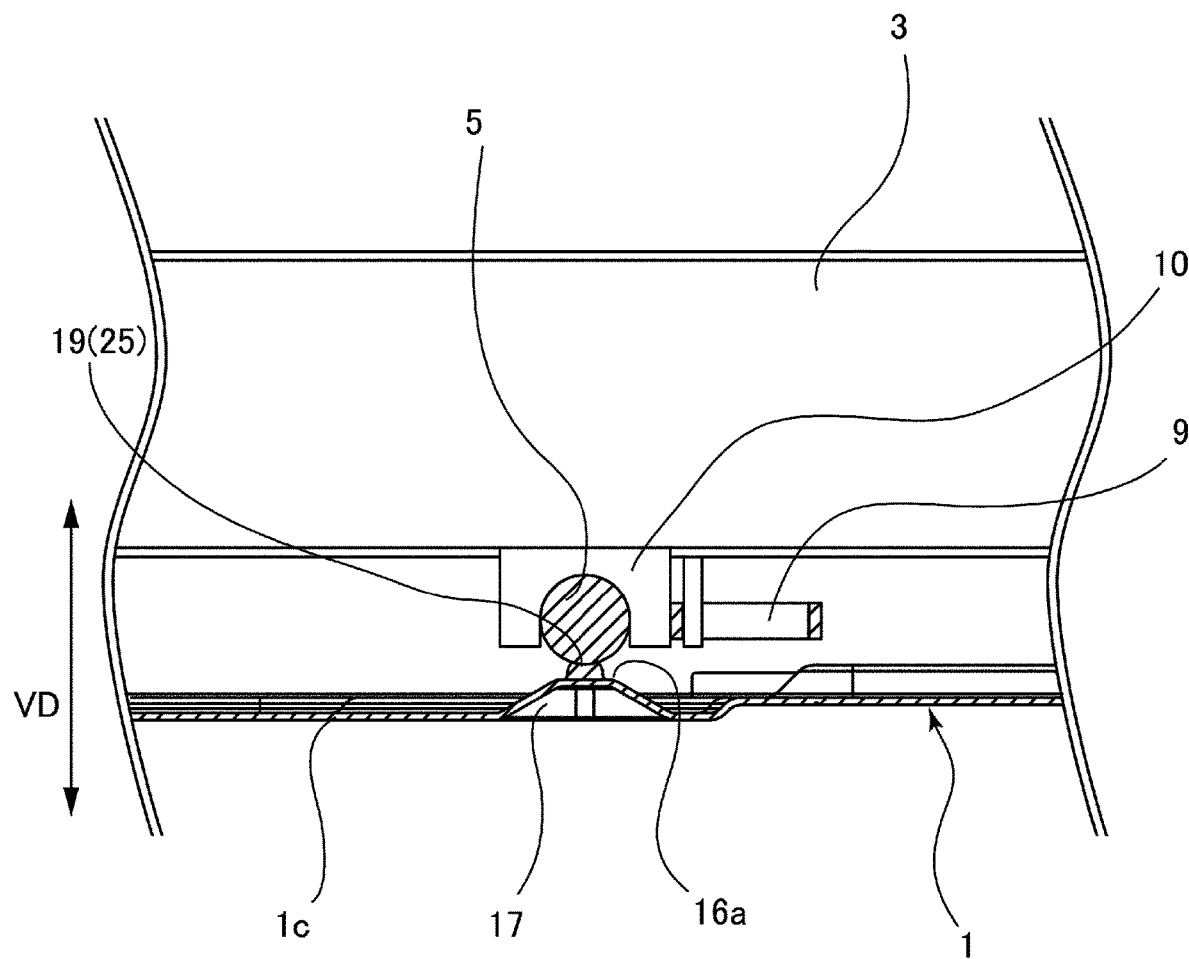
FIG. 5 is a sectional view of the reading apparatus, at a plane B-B in FIG. 2.

FIG. 4 is a sectional view of the end portion of the guide shaft, and its adjacencies, shown in FIG. 3, at a plane A-A in FIG. 3. FIG. 5 is a sectional view of the reading apparatus, at a plane B-B in FIG. 2. Referring to FIGS. 3 and 4, a lateral wall 1a, which is one of the lateral walls of the casing 1 in terms of the shaft direction AD, is provided with a hole 61, in which the end portion 51 of the guide shaft 5 is fitted to be supported by the lateral wall 1a. Similarly, the other lateral wall 1b of the casing 1, in terms of the shaft direction AD, is provided with a hole 62, as the second supporting portion, in which the other end portion of the guide shaft 5 is fitted to be supported by the lateral wall 1b.

The end portions 51 and 52 of the guide shaft 5 are prevented by a pair of fixing members, such as E-shaped locking rings, from coming out of the holes 61 and 62 of the lateral walls, respectively, that is, from becoming disengaged from the lateral walls. By the way, all that is necessary is that at least one of the end portions 51 and 52 is kept locked to the corresponding lateral wall of the casing 1 by a fixing member. As described above, the guide shaft 5 is precisely positioned relative to the casing 1, in terms of the shaft direction AD, and also, the radius direction of the guide shaft 5, which is perpendicular to the shaft direction AD.

On the other hand, referring to FIGS. 1 and 2, the bottom wall 1c of the casing 1, which is below the guide shaft 5, is provided with multiple (three, in this embodiment) protrusive portions 16, 17, and 18, which protrude upward toward the guide shaft 5. The protrusive portions 16, 17, and 18 are formed by crimping, for example. They are positioned directly below, being aligned in the shaft direction AD, with the provision of a preset amount of interval between the adjacent two. Further, in terms of the shaft direction AD, the protrusive portions 16, 17, and 18 are positioned between the holes 61 and 62, in such a manner that they divide the portion of the guide shaft 5, which is between the holes 61 and 62, into four sections, which are equal in length.

The top surface (16a, for example, in FIG. 5) of each of the protrusive portions 16, 17 and 18 is provided with a preset amount of adhesive (19, 20 or 21), which makes up an adhesive portion 25. The adhesives 19, 20 and 21 also are positioned directly below the guide shaft 5, like the protrusive portions 16, 17 and 18, being aligned in the shaft direction AD with the provision of a preset amount of gap between the adjacent two. For example, in terms of the shaft direction AD, the adhesive 20, as the second adhesive, is positioned a preset distance from the adhesive 19 as the first adhesive. Also, in terms of the shaft direction AD, the adhesives 19, 20 and 21 are positioned between the holes 61 and 62, in such a manner that they divide the length of the portion of the guide shaft 5 between the holes 61 and 62, into four sections which are roughly equal in length.

In terms of the direction which is parallel to the radial direction of the guide shaft 5, which is perpendicular to the shaft direction AD, as well as the vertical direction, the adhesives 19, 20 and 21 are positioned between the protrusive portions 16, 17 and 18, which are integral parts of the casing 1, and the guide shaft 5, in such a manner that they hold the protrusive portions 16, 17 and 18 and guide shaft 5 together, while remaining elastic. The adhesives 19, 20 and 21 have only to be elastically deformable after they harden. That is, the adhesives 19, 20 and 21 do not need to be controlled in material, and the ingredients thereof, as long as they remain elastically deformable after they harden. For example, ordinary adhesive which hardens in the air, UV adhesive which is curable with UV light, thermoplastic adhesive, etc., are usable as the adhesives 19, 20 and 21.

By the way, in this embodiment, the number of the protrusive portions 16, 17 and 18 and that of the adhesives 19, 20 and 21 are both three. This embodiment, however, is not intended to limit the present invention in scope in terms of the number of the protrusive portions and that of the adhesives. They may be one, two, or four or more.

As described above, the guide shaft 5 is supported by the adhesive portion 25. Therefore, it is not in direct connection to the casing 1, except for the portions which correspond in position to the portions of the casing 1, which have the holes 61 and 62, one for one. In other words, the guide shaft 5 is directly supported by only the portions of the casing 1, which correspond in position to the holes 61 and 62. By the way, the image reading apparatus 101 may be structured so that the guide shaft 5 is supported by something other than the casing 1. For example, the image reading apparatus may be structured so that the guide shaft 5 is supported by springs or sponges.

[Function of Adhesive]

By the way, there are various types thinkable for the reading portion 3 depending on the specifications of an apparatus in which the reading portion 3 is mounted, and also, what kind of optical system employed by the reading portion 3, for example, a reduction optical system or a contact optical system. The reading portion of a reduction optical system has: multiple optical mirrors, optical lenses, an imaging element, and an illuminating apparatus having multiple light sources. The reading portion of a contact optical system is smaller than a reduction optical system. It has a lens assembly, an imaging element, an illuminating apparatus, and a small casing in which preceding components are mounted. That is, an apparatus for which the reading portion 3 is employed is variable in the size of each components of the apparatus, and component count, depending on its specification. Therefore, the reading portion 3 is variable in size and weight depending on the specifications of an apparatus.

Referring to FIG. 5, the reading portion 3 has a holding portion 10, which is supported by the guide shaft 5 in such a manner that it is movable in the shaft direction AD. The holding portion 10 is loosely fitted around the guide shaft 5. Therefore, the level of accuracy at which an image is read by the reading portion 3 is affected by how straight the guide shaft 5 is. In other words, as the guide shaft 5 deforms, the reading portion 3 reduces in the level of accuracy at which it can reads an image.

A reading portion varies in size and weight depending on its type. As a scanning job is started, the reading portion 3 moves in the shaft direction AD. Thus, the guide shaft 5 is subjected to a certain amount of load, which is attributable to the vibrations caused by the moment which occurs as the reading portion 3 moves, and the weight of the reading portion 3 itself. Referring to FIGS. 1-5, the load to which the guide shaft 5 is subjected is caught by the adhesives 19, 20 and 21, which are between the holes 61 and 62. Thus, the guide shaft 5 is prevented from bowing downward. Therefore, the reading portion 3 is prevented from reducing in the level of accuracy at which it reads an image.

Further, even if the bottom wall 1c of the casing 1 deforms, and/or a user gives vibrations or the like to the casing 1, the adhesives 19, 20 and 21, which are formed so that they can elastically deform, absorb these deformations and vibrations. For example, if the bottom wall 1c of the casing 1 deforms in such a manner that its center portion displaces upward, the protrusive portions 16, 17 and 18, with which the casing 1 is provided, move upward toward the guide shaft 5. However, the adhesives 19, 20 and 21, which are provided between the protrusive portions 16, 17 and 18 and guide shaft 5 absorb the displacement of the protrusive portions 16, 17 and 18. Therefore, the guide shaft 5 is prevented from deforming. Therefore, the reading portion 3 is prevented from being reduced in its reading performance.

In this embodiment, the adhesives 19, 20 and 21 have lengths L1, L2 and L3, respectively, in terms of the shaft direction AD. Further, the lengths L1, L2 and L3 of the adhesives 19, 20 and 21, respectively, are set so that a sum (L1+L2+L3) of the lengths of the adhesives 19, 20 and 21 becomes no more than ⅓ of the length L4 (FIG. 2) of the guide shaft 5.

Therefore, it is possible to provide the image reading apparatus 100 with areas R1, R2, R3 and R4, which are between the holes 61 and 62, and in which the guide shaft 5 is directly supported by the adhesives 19, 20 and 21. In these areas R1, R2, R3 and R4, the guide shaft 5 does not catch the deformation and/or vibrations of the casing 1. Therefore, it is possible to effectively prevent the deformation of the guide shaft 5 to prevent the reading portion 3 from reducing in its reading performance.

Further, in terms of the vertical direction VD, the adhesives 19, 20 and 21 have a thickness of 0.5 mm-3.0 mm. It is preferable that in terms of the vertical direction VD, the adhesives 19, 20 and 21 have a thickness of 1.0 mm-2.5 mm. In this embodiment, they have a thickness of 1.7 mm. Further, the adhesives 19, 20 and 21 are lower in rigidity than the casing 1 formed of a metallic material. Therefore, the adhesives 19, 20 and 21 can effectively absorb the displacement of the protrusive portions 16, 17 and 18. Therefore, this embodiment can prevent the reading portion 3 from reducing in image reading performance.

As described above, not only is the downward deformation of the guide shaft 5, which is attributable to the weight and vibrations of the reading portion 3 itself prevented by the adhesives 19, 20 and 21, but also, the upward displacement of the protrusive portions 16, 17 and 18, which is attributable to the deformation and vibrations of the casing 1 is absorbed by the adhesives 19, 20 and 21. Therefore, the guide shaft 5 is prevented from deforming, and the reading portion 3 is prevented from reducing its reading performance.

Further, all that is necessary to embody the present invention is to fit the guide shaft 5 into the holes 61 and 62 after the application of adhesives 19, 20 and 21 to the protrusive portions 16, 17 and 18, respectively. That is, this embodiment can improve a reading portion in the efficiency with which it can be assembled. Further, this embodiment can reduce the guide shaft 5 in the amount of deformation, without requiring other elastic members, such as leaf springs and sponges, than the adhesives 19, 20 and 21, to be placed between the guide shaft 5 and bottom wall 1c of the casing 1. Thus, this embodiment can reduce a reading portion in cost and size.

<Miscellanies>

In this embodiment, the casing 1 was formed of a metallic material. This embodiment, however, is not intended to limit the present invention in scope in terms of the material for the casing 1. For example, the present invention is compatible with a casing formed of a resinous material. Further, in this embodiment, the guide shaft 5 was cylindrical. This embodiment, however, is not intended to limit the present invention in scope in terms of the shape of the guide shaft 5. That is, the present invention is also compatible with a guide shaft which is oval or polygonal, in cross-section.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-216152 filed on Nov. 29, 2019, which is hereby incorporated by reference herein in its entirety.

What is claimed is:

1. An image reading apparatus comprising:
a guiding shaft extending in an axial direction;
a reading portion supported by said guiding shaft so as to be movable in the axial direction;
a casing accommodating said reading portion, said casing including a first supporting portion supporting an end portion of said guiding shaft, a second supporting portion supporting the other end portion of said guiding shaft, and a bottom surface below said guiding shaft;
a first projected portion projecting from said bottom surface, the first projected portion being provided between said first supporting portion and said second supporting portion in the axial direction;
a second projected portion projecting from said bottom surface, the second projected portion being provided between said first supporting portion and said second supporting portion in the axial direction and spaced from said first projected portion in the axial direction;
a first bonding portion being elastically deformable and bonding an upper surface of said first projected portion and said guiding shaft with each other; and
a second bonding portion being elastically deformable and bonding an upper surface of said second projected portion and said guiding shaft with each other.

2. An apparatus according to claim 1, wherein said guiding shaft is supported only by said first supporting portion, said second supporting portion, said first bonding portion, and said second bonding portion.

3. An apparatus according to claim 1, wherein each of said first and second bonding portions has a thickness of 0.5 mm-3.0 mm as measured in a vertical direction.

4. An apparatus according to claim 1, wherein said first and second bonding portions are less stiff than said casing.

5. An apparatus according to claim 1, wherein said first and second bonding portions include a plurality of adhesive materials, and wherein a total sum of the plurality of adhesive materials in the axial direction is not more than one-third the length of said guiding shaft.

6. An apparatus according to claim 1, wherein said first bonding portion includes a first adhesive material and said second bonding portion includes a second adhesive material, and the first and second adhesive materials are provided between said casing and said guiding shaft.

7. An apparatus according to claim 1, wherein said casing comprises metal material.

* * * * *